9102X
J. S. Harris.
Corn Sheller.
Patented Sept. 18, 1835.
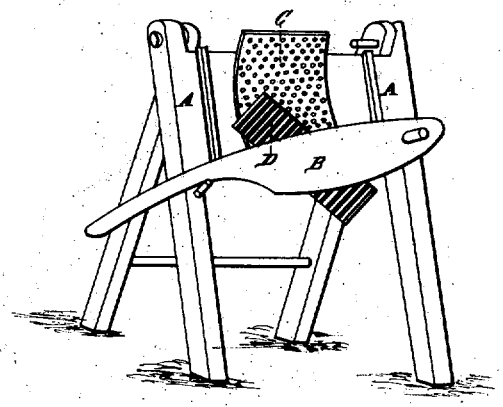

James S. Harris 9102X
Letters Patent 50 cts

The schedule referred to in these Letters Patent and making part of the same containing a description in the words of the said James S. Harris himself of his improvement in the mode of shelling corn.

To all to whom these presents shall come. Be it known that I James S. Harris of Poultney in the County of Rutland and State of Vermont have invented a new and useful improvement in the mode of shelling corn by a machine called Harrises Corn Sheller and that the following is a full and exact description of the construction and operation of the said Corn Sheller as invented by me. This machine consists of a frame a lever and a sheller. The frame consists of two posts about three feet long which are placed two feet apart and parallel. a board about fifteen inches wide is framed into the upper ends of these posts which forms the front side of the machine. This frame is supported by two standards connected by pins to the upper ends of the Posts so as to form joints. The front side is inclined backwards. The lever is about three feet long one end of which rests upon a pin in the rear of the machine, which is placed through the posts at the centre of the board before described. This pin is the fulcrum and upon which the lever moves up and down. The sheller consists of two graters, the under one is formed of heads, points nails or wire driven into the board about one quarter of an inch apart and about one quarter of an inch in length or it may consist of sheet iron with holes perforated through it so as to form a roughness, or it is composed of a cast iron plate with points or teeth. This grater is about fourteen inches long and six inches wide and is placed about ten inches forward of the fulcrum and made fast to the board by screws. The upper grate or box is about fourteen inches long and four inches wide and is shovel shaped being three fourths of an inch deep at one end with sides diminishing in width towards its mouth and is constructed of the length and depth sufficient to roll the ears of corn and not come in contact with the under grater. The upper grater or box is formed or composed of the same materials and in the same manner as the under grater before described and is placed upon the

370.

9102X the inner side and edgewise of the lever with its mouth downwards and its upper end inclined towards the handle of the lever and in such manner when put in operation as will correspond with the under grater. The upper grater moves upon a circle with the lever. There are gauges or sets placed upon the board to guide the lever and prevent the graters coming in contact. The operation of this machine is that the performer supplies the sheller with his left hand and moves the lever downwards with his right hand. The ears of corn come in contact with the graters and are rolled and forced endwise. In testimony that the above and foregoing is a true specification of my said improvement as above described I have hereunto set my hand the 14th day of June in the year of our Lord one thousand eight hundred and thirty five Witnesses
Eben^r. Wallis
B. H. Ransom James S. Harris (630 wds)

E.F.
C.M.W.

Patented 18 Sept 1835

(Drawing) 50 cts